(12) United States Patent
Wang et al.

(10) Patent No.: US 11,423,440 B2
(45) Date of Patent: Aug. 23, 2022

(54) METHOD, APPARATUS, AND MACHINE-READABLE MEDIUM FOR COMMUNICATING PRODUCT INFORMATION

(71) Applicant: Bayerische Motoren Werke Aktiengesellschaft, Munich (DE)

(72) Inventors: Wei Wang, Mountain View, CA (US);
Daniel Grein, Mountain View, CA (US)

(*) Notice: Subject to any disclaimer, the term of this patent is extended or adjusted under 35 U.S.C. 154(b) by 24 days.

(21) Appl. No.: 16/715,114

(22) Filed: Dec. 16, 2019

(65) Prior Publication Data

US 2021/0182903 A1 Jun. 17, 2021

(51) Int. Cl.
*G06Q 30/02* (2012.01)
*G06Q 10/10* (2012.01)
*G09B 19/00* (2006.01)
*H04L 67/55* (2022.01)
*H04W 4/23* (2018.01)

(52) U.S. Cl.
CPC ....... *G06Q 30/0251* (2013.01); *G06Q 10/107* (2013.01); *G06Q 30/0265* (2013.01); *G06Q 30/0277* (2013.01); *G09B 19/00* (2013.01); *H04L 67/26* (2013.01); *H04W 4/23* (2018.02)

(58) Field of Classification Search
CPC .......... G06Q 30/0251; G06Q 30/0265; G06Q 30/0277
See application file for complete search history.

(56) References Cited

U.S. PATENT DOCUMENTS

| | | | | |
|---|---|---|---|---|
| 7,289,611 B2* | 10/2007 | Iggulden | ............. | B60R 16/0231 379/102.03 |
| 9,870,649 B1* | 1/2018 | Fields | ..................... | G06Q 40/08 |
| 10,423,982 B2* | 9/2019 | Wasserman | .............. | G08B 5/00 |
| 2011/0258044 A1* | 10/2011 | Kargupta | ........... | G06Q 30/0251 705/14.49 |
| 2016/0048370 A1* | 2/2016 | Zenoff | .................. | G06F 1/1652 715/734 |
| 2016/0358477 A1* | 12/2016 | Ansari | ............... | G06Q 30/0251 |

* cited by examiner

*Primary Examiner* — Azam A Ansari
(74) *Attorney, Agent, or Firm* — 2SPL Patent Attorneys PartG mbB; Kieran O'Leary

(57) ABSTRACT

Embodiments generally relate to a method, an apparatus, and a machine-readable medium for communicating product information, particularly where the product is a vehicle. Embodiments relate to a method comprising receiving usage information relating to an at least one feature of a product, analyzing the usage information to determine if the received information exceeds a usage threshold, and selecting educational information based on the usage information. The educational information comprises information relating to the at least one feature. The method further comprises selecting an at least one communication channel, and communicating the educational information through the at least one communication channel.

14 Claims, 2 Drawing Sheets

METHOD, APPARATUS, AND MACHINE-READABLE MEDIUM FOR COMMUNICATING PRODUCT INFORMATION

FIELD

Embodiments generally relate to a method, apparatus, and machine-readable medium for communicating product information. In particular, embodiments relate to a concept for communicating educational information about a vehicle.

BACKGROUND

Media campaigns for products are largely sales-driven and targeted towards potential new customers to show them the reasons to buy a new product. This is often done by advertising some of the features of the product. However, existing customers who previously purchased the product might not benefit from the sales-focused advertisements in these campaigns. Nevertheless, all of the features of the product they purchased might not be known or properly explained to them. This is particularly true of complex products, such as new vehicles, that have numerous features beyond those that are typically advertised in media campaigns. Hence there may be a desire for an improved method of advertising to existing customers of vehicles.

SUMMARY

Embodiments in the present disclosure relate to a method for informing a user of a product about a feature related to the product. According to an embodiment, a method comprises receiving usage information relating to an at least one feature of a product, analyzing the usage information to determine if the received information exceeds a usage threshold, and selecting educational information based on the usage information. The educational information comprises information about the feature related to the product. The method further comprises, selecting an at least one communication channel, and communicating the educational information through the at least one communication channel.

Product advertisements that target potential new customers might not benefit existing customers or users of the product that have already been persuaded by a past advertisement and are not seeking to purchase a new product. Furthermore, product communication with existing customers about the product they currently own often eschews the typical channels of advertising, even if they have been proven effective at reaching the customer. Therefore, existing customers are often not engaged by media campaigns after the point-of-sale and during the lifetime of their purchased product. Products, particularly vehicles, are increasingly equipped with more complex and powerful tools. Consequently, the customer or another user might not be aware of all the features of the product they purchased or they might not be aware of how to properly or best use a feature. Therefore, the value of the product is not fully realized and the customer might not obtain the maximum potential satisfaction from their purchase. This may be especially true markets where products are purchased off a shelf or a lot instead of being configured according to the individual customer. This is may also be true of users who are not the purchaser but still make extensive use of the product, such as a child or a spouse. To obtain the knowledge of their vehicle, consumers must be proactive and seek out manuals, explore the features of their vehicles, or engage with representatives of their vehicle's manufacturer for assistance.

The above-described method offers another option. By analyzing how a user interacts with features of their product, educational material may be selected for them based on their interaction profile. This educational information may then be provided directly to the individual user, or a group of similar users, through advertising channels typically used to target new customers.

According to another embodiment, the product may be a vehicle. Vehicles are becoming increasingly complex and all of the features of a vehicle might not be advertised in sales-focused media campaigns or explained to the customer or user before the point-of-sale. Consequently, a user might not be aware of all the features of their vehicle or how to properly use them. Common scenarios may involve providing educational content about the features of a vehicle that are not unique to the vehicle and thus not typically marketable differences yet are still important features to a daily driver or passenger of the vehicle. This could include a particular car manufacture's infotainment system that is installed across several vehicle models (e.g. BMW AG's iDrive®) or third-party integrations (e.g. Apple, Inc.'s CarPlay®). This may also include services that are provided to existing users that are connected with the vehicle, such as a connected app that may be installed on the user's smartphone or events that are put on for users. Additionally, educational content may relate to the type of driver and situations they are likely to encounter, such as how to improve highway driving or where to find secured parking.

According to another embodiment, the usage information comprises information from a central processing unit of the product or an electronic device connected to the product. Usage information can be taken directly from the user's vehicle through onboard computer systems with access to the telemetry data of the vehicle and connected software and hardware components. Usage information may also be taken from a device connected to the product, such as the user's cell phone. A cell phone may receive information from the product and relay it in real-time or periodically. This may be useful if a user's product does not have a dedicated internet connection, such as a cellular radio. A cell phone may also be able to deduce information about the product and supplement the information provided by the product alone. For instance, if a driver of a vehicle is using their cell phone to play Spotify® through the car's Bluetooth connection, the cell phone may relay this usage information and education may be selected informing to inform the driver of the Spotify application installed on the vehicle's infotainment system.

Usage information may comprise information about an individual user. This may involve developing a customer profile or type of the user and targeting educational information on an advertisement platform using the customer profile. An embodiment of the method may further include selecting an at least one communication channel comprises selecting a communication channel to target the individual user. This allows the user to be accurately targeted on first-party and third-party platforms using the identifying information included in the usage information.

Analyzing the usage information may comprise determining a customer profile or type of the individual user, and selecting an at least one communication channel comprises selecting a communication channel to target the individual user individual user's customer type. This allows the educational information to be disseminated more widely than the platforms that the user is known to use while still potentially reaching the user and it may also have the benefit of being narrowly targeted resulting in lower advertising costs to the manufacturer. For instance, if usage information indicates that users of a certain gender, income, and who use a particular brand of a mobile device are unlikely to fully use or be aware of the connected features of a vehicle. The educational content on those connected features may be targeted towards all users that fit the profile and use the particular mobile device. This makes so that users who may benefit from the educational content are likely to be reached without targeting the advertisements individually to each user.

In an embodiment of the method, analyzing the usage information comprises determining if previous educational information was communicated to the individual user. By knowing if previously supplied educational information has been targeted to the user the thresholds of whether to resupply the information can be adjusted. If a user has been successfully targeted with education on how to use a feature and their behavior changes to use that feature, then the threshold may no longer be met to supply the user with additional educational information is. Further, if a user has been successfully targeted with the educational information but is still not using the feature, then it may be determined that the user is not willing to use the feature and a threshold on whether to continue to supply that user with information may be raised.

Selecting an at least one communication channel, in another embodiment, may comprise selecting an at least one alternative communication channel. If usage information indicates that a user has not been successfully targeted with information thresholds have determined that a user is not using a feature then it may be determined to target the user on other media channels. For instance, if a user has been served advertisements on a streaming media platform but has not seen them, engaged with them, or has skipped them, then it may be determined to target the user through an in-app notification, text-based advertisement, or with a still-image ad on a social network. This allows for the method to be adapted based on the individual media consumption habits of an individual user.

In another embodiment of the method, the usage information comprises information related to systems usage, journey, maintenance, or the user. Usage information can come from any component of the driving experience to inform the selection of educational content. System usage information could drive the selection of educational information on safety features, such as how to engage and use automatic cruise control, or navigation features, such as how to use a cellphone to input navigation directions instead of the vehicle's display system. Journey usage information could inform the selection of educational content regarding last-mile services. For instance, if a user routinely makes short journeys educational finishes journeys in crowded areas with little parking, educational content on a scooter, bike, or another short distance mode of transport that allows the user to park cheaply near their destination and use these other "last-mile" services to complete it. Maintenance information may be used to inform the user about the proper methods to care for their vehicle, different services offered by their vehicle's manufacturer or dealer with regards to services, or to simply remind the user to take their vehicle for service. User information may be used to inform the user about features that may improve their driving experience. For instance, if a user lists a preference for a sportier ride educational content may be provided for them on methods to tighten their suspension, adjust ride height, use launch control, or other settings to adjust the ride to better align with their preferences.

In an embodiment of the method, the educational information comprises information related to vehicle features, events, products, or environments. Educational information related to vehicle features may include those related to a vehicle's safety, media system, navigation system, or climate control system. Event information may include invitations to seminars, in-person training, or social gatherings with like-minded users. Educational information on product features may include information on how to install items such as a child seat, mobile device mount, trailer hitch, bike or roof rack. Environment education may inform the users about last-mile services, areas they frequently visit or are planning to visit, or driving in harsh or unfamiliar conditions (e.g. driving in snow, in fog, or off-road).

In an embodiment of the method, communicating the educational information comprises communication by telecommunication, advertising, notifications on electronic devices, or physical media. The method of communication is tailored to the user and what platform they best respond to the educational information. This may include reaching the user through interactive or animated advertisements on video streaming services like YouTube®, Netflix®, or AppleTV®. It may also involve static advertisements on platforms like Instagram or text-based advertisements through chat services like Facebook Messenger. Still, further methods may include pushing notifications directly to a user's electronic device through a messaging or physically mailing a user who cannot be effectively reached on electronic media platforms.

In a further embodiment of the method, the usage information comprises information on the feature related to the vehicle that the user does not use, and the educational information comprises information on how to use the feature. The educational information could be targeted toward a feature the user would likely use but has not yet used or not successfully used the feature. For instance, if usage information conveys that a user frequently drifts out of their lane but has lane assist disengaged, educational content can be selected to inform the user about the lane assist feature. In another example, if a user routinely inputs their driving destination on an in-vehicle input mechanism educational content could be provided to them about a method to input that info remotely via their phone.

An embodiment of the method may include communicating the educational information on a display of the vehicle. A user may want educational information to be provided to them directly in the vehicle. This may be an effective way to convey information because the user would be able to actively apply any information gleaned from the educational material in real-time while they are present in the vehicle. For instance, if usage information conveys that a user constantly adjusts their seat and steering wheel before driving the vehicle, educational information could be presented to them on how to store a seat and wheel configuration in the vehicle's memory. Likewise, this would be useful for any complicated or unobvious procedures that a user would prefer to review while near the vehicle, such as installing a roof rack, setting a height on an automatic rear lift-gate, or winterizing their vehicle.

In an embodiment of the method, communicating comprise sending an email to an inbox of a use, pushing a notification to an app, or advertising to the user over an online advertisement platform. Communicating with the user entails reaching them at their most used platforms. For example, if the information on a user (such as in a customer profile) indicates that they preferred to be reached by email, educational information will be communicated to them through that avenue. Likewise, pushing educational content to a user through the app or as a notification may be the preferred way to reach them if a user has an app related to the vehicle. Communicating the information to the user via advertising platforms may provide for integrating the educational information directly into their daily routine. If user information indicates that a user is a customer of YouTube or Instagram, the direct advertising to them of the educational information may benefit the user by providing them with directly relevant information to a product they already own. It may also present beneficial information to them in a format they are familiar with and comfortable with. Finally, it provides the manufacturer of the product with direct access to a user who may make better use of their product and has demonstrated a willingness to purchase from the manufacturer in the past.

An embodiment of the method may be performed by an apparatus that informs a user of a vehicle about a feature related to the vehicle. The apparatus comprises at least one interface configured to communicate with at least the vehicle and the user and a processor. The processor is configured to receive usage information via the at least one interface relating to an at least one feature of the vehicle, analyze the usage information to determine if the received information exceeds a usage threshold, and select educational information based on the usage information. The educational information comprises information relating to the at least one feature. The processor is further configured to select an at least one communication channel and communicate the educational information through the at least one communication channel via the at least one interface. The apparatus may be contained in a vehicle, server, or phone.

Further, the method might also be performed by a non-transitory machine-readable medium storing a program causing a computer to execute a process for informing a user of a vehicle about a feature related to the vehicle. The process comprises receiving usage information relating to at least one feature of a product, analyzing the usage information to determine if the received information exceeds a usage threshold, and selecting educational information based on the usage information. The educational information comprises information relating to the at least one feature. The process further comprises selecting at least one communication channel and communicating the educational information through the at least one communication channel. This allows for existing computer controlled-apparatuses to be configured to execute the method.

BRIEF DESCRIPTION OF THE FIGURES

Some embodiments of apparatuses and systems will be described in the following only by way of example and with reference to the accompanying figures, in which.

DETAILED DESCRIPTION

Various embodiments will now be described more fully with reference to the accompanying drawings in which some embodiments are illustrated. The thicknesses of lines, layers, and/or regions in the figures may be exaggerated for clarity.

Accordingly, while further embodiments are capable of various modifications and alternative forms, some particular embodiments thereof are shown in the figures and will subsequently be described in detail. However, this detailed description does not limit further embodiments to the particular forms described. Further embodiments may cover all modifications, equivalents, and alternatives falling within the scope of the disclosure. Same or like numbers refer to like or similar elements throughout the description of the figures, which may be implemented identically or in modified form when compared to one another while providing for the same or similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations (i.e. only A, only B, as well as A and B) if not explicitly or implicitly defined otherwise. An alternative wording for the same combinations is "at least one of A and B" or "A and/or B". The same applies, mutatis mutandis, for combinations of more than two elements.

The terminology used herein to describe particular embodiments is not intended to be limiting for further embodiments. Whenever a singular form such as "a," "an" and "the" is used, and using only a single element is neither explicitly nor implicitly defined as being mandatory, further embodiments may also use plural elements to implement the same functionality. Likewise, when functionality is subsequently described as being implemented using multiple elements, further embodiments may implement the same functionality using a single element or processing entity. It will be further understood that the terms "comprises," "comprising," "includes" and/or "including," when used specify the presence of the stated features, integers, steps, operations, processes, acts, elements, and/or components but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the embodiments belong.

Figure 1:
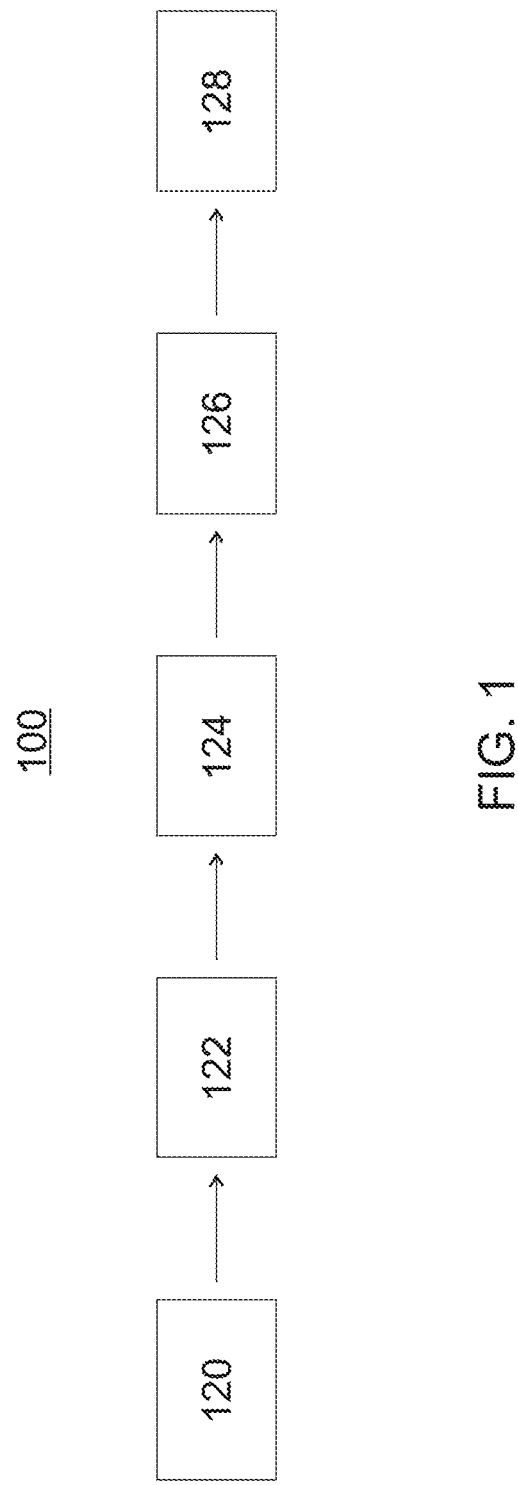
FIG. 1 shows a block diagram of a method for communicating product information.

FIG. 1 shows a block diagram of a method 100 for a product information system. FIG. 1 shows a method 100 for communicating product information. The method 100 comprises receiving usage information 120 relating to an at least one feature of a product. Then analyzing the usage information 122 to determine if the received information exceeds a usage threshold. The method continues by selecting educational information 124 based on the usage information, wherein the educational information comprises information relating to the at least one feature. Then selecting an at least one communication channel 126. The method further comprises communicating the educational information 128 through the at least one communication channel.

A product can be any item, including a vehicle or a home, with features whose usage or interactions can be tracked. Receiving usage information 120 means receiving data that has been recorded about the usage or interactions with a feature of a product. A feature of a product may be hardware or software features. For instance, usage information on a navigation system of a vehicle may include the usage of the system, including physical button presses. However, it may also include the usage of, or interactions with, the software of the navigation system. Interactions may include telematics, menu clicks, menu states, voice inputs, touch screen inputs, button press, or the non-use of feature sets. Usage information may also be gathered through the onboard, built-in diagnostic (OBD) port when the vehicle is in service.

Analyzing usage information 122 means processing received usage information and determining the received information exceeds a usage threshold. If the threshold is reached if educational information may be required. Thresholds may be determined based on individual features and the educational information concerning the features. Thresholds may be quantitatively measured, such as if a feature of a product is not being used over a certain period. For example, if a driver of a vehicle has not activated the lane assistant feature over a certain period, a time-based threshold could be exceeded. As another example, a threshold could be exceeded if lane road sensors detect land departures at an above-average rate. Thresholds can universal or individually tailored to the vehicle, driver, or environment. For instance, if a vehicle comprises a launch control feature a threshold may be exceeded if the feature has never or seldom been activated but the usage indication also indicates that a driver of a vehicle enjoys sporty driving. Whereas a threshold might not be exceeded if the usage information indicates that the drive enjoys casual driving. Furthermore, thresholds may be updated if the usage information indicates that the threshold was inaccurate or improperly calculated based on the vehicle, driver, environment, or other conditions. Usage information may include both interaction data and telematics data from the product. The combination of the interaction data and the telematics data may be cross-referenced to increase the accuracy of what thresholds are exceeded.

Selecting educational information 124 means determining educational information to communicate about the product to a customer or user to better inform the user about the product. The aim of educational information may be to alter the behavior of the user so that the thresholds related to the product are not exceeded. Selecting an at least one communication channel 126 means determining how best to reach a user with the educational information. Selecting an at least one communication channel 126 may also mean selecting the communicational channel based on the format of the selected educational information. For example, if the selected educational information is video-based then the channel to be selected should support video or the video should be able to be programmatically adapted to fit the constraints of the channel.

Communicating educational information 128 means sending the determined educational information to a customer or user in a format deemed relevant to the user. This may include reformatting educational information to better fit the communication channel that is best suited to reach the user. For instance, if a user is deemed likely to respond to information on a platform for sharing still images (e.g. Instagram) communicating the educational information may comprise selecting individual frames from a video or other media type to present to the user on the still-image platform. It may also include dividing a video into increments to fit a story-feature with limited time windows. Or it may include cropping or resizing a video to fit the aspect ratio of the device on which it is viewed.

The method may be performed when the product is a vehicle. Vehicles are complex products where all features might not be advertised or readily apparent to the user before purchase. Additionally, with the availability of software updates, new features may be added to the vehicle after the point-of-sale and thus might not be known to the user or present in any of the educational material presented to them at purchase.

Such features may include safety features, such as lane-keeping, automatic cruise control, collision mitigation, pedestrian detection, park assist, advanced driver-assist features (including those in autonomous vehicles), how to adjust seating and steering wheel position, how to call roadside assistance, and schedule maintenance appointment from within the vehicle. Autonomous driving levels are specified by SAE International's SAE J3016, which classifies autonomous driving systems for vehicles. As autonomous driving is further developed, vehicles without or with lower level autonomously driving capabilities may be updated to operate at higher autonomous driving levels. This may require further driving education and training for current users of vehicles that comprise the necessary hardware for autonomous driving but have not yet received the necessary software.

Many vehicles are connected to the internet and therefore have systems and features that affect the vehicle but are activated remotely. These systems (such as on BMW's ConnectedDrive system) may also require education because their existence might not be readily discoverable from the vehicle itself. Such features include remotely pre-conditioning cabin, activating alarm via an app, locking or unlocking the vehicle via smartphone, using a smartwatch as a remote, setting up driver profiles, syncing a calendar or other third-party information with the vehicle, or creating a digital key pass for other drivers.

Likewise, education on navigation features may also be useful for a customer, driver, or another user. This may include education on input modalities, voice control, forwarding directions from a phone, or programing home and frequent destinations in quick-access keys or functional bookmarks.

Educational content may be used to inform a user about a media system. For example, how to connect a mobile device (e.g. connected by a wired, Bluetooth, or WiFi connection), stream music, mirror cast video, play music from external storage device, rewind and fast forward satellite radio, saving presets or favorites, how to customize audio levels, or how to use an intelligent personal assistant.

Additionally, educational information may be beneficial for third-party integrations with a vehicle or for downloadable apps that might not be present when the vehicle is purchased. Such integrations or applications may include Apple Carplay, Android Auto®, Spotify®, Apple Music®, Amazon Music®, Tidal®, navigation updates, or points of interest updates.

Educational information may include services that affect a user of a vehicle but do not correspond to the vehicle, services may include a carshare program, preferred parking locations, or last-mile services. It may be determined to select educational information 124 on last-mile services when, for example, several journeys are measured as terminating away from their inputted destination in urban areas, as measured by the vehicle's navigation system and GPS or other positioning systems. If a driver is not reaching their destination at a level that exceeds a threshold (because, for example, the driver cannot find parking) it may be determined that the driver requires educational information on last-mile services so that they can park in a more vehicle-friendly location and complete the rest of their journey by a scooter, a bike, or another method of last-mile transportation. Additionally, usage information may indicate, for example, that a driver makes short, intra-city journeys that often result in parking fees (because, for example, the journey often ends in a parking garage). The threshold exceeded being several journeys that end in fee-incurring locations. Selecting educational information 124, in this case, may include selecting information on carsharing services that allow the driver to park without incurring fees other than the cost of the carshare, thus resulting in a lower amount of measured journeys that end in fee incurring locations.

Educational information may be used to inform a user about climate control or heating, ventilation, and air conditioning (HVAC) systems, seating memory, steering wheel position, heated surfaces, seat cooling, ambient lighting. It may also be used to teach a user how to install or make better use of installed items. For example an International Organization for Standardization standard ISO 13216 (Isofix) child seat, a personal mobile device mount, a roof rack, a bike rack, or a trailer hitch. Selecting this educational information may be driven by a sensor in the vehicle detecting an installed item. It may also be driven by purchases made from a manufacturer or dealer of a vehicle that trigger or exceed a threshold. For example, if a roof rack is determined to be installed on a vehicle, educational information may be used to teach a user about how to best mount luggage or other items to the rack in order to minimize aerodynamic drag and maximize the range of a luggage-laden vehicle.

Educational information may also comprise information on personalization based on a driver's inputted or measured preferences. This may include information on drive modes, audio levels, ride height, configuring a heads-up display, gesture controls, configuring gauge cluster information, how to customize central information display menu widgets, launch control, dynamic stability control configuration, or how to adjust suspension and drivetrain settings to the drivers liking.

For electric vehicles, plug-in hybrids, or other vehicle types a driver may be unfamiliar with, educational information may include how to optimize range, optional ways to charge (wired, wireless, DC fast, level 2), or charging habits to save the user money and extend the life cycle of the batteries.

The usage information may comprise information about an individual user. Usage information about an individual user can be determined based on the habits of a user as they interact with a product. For instance, if a user of a vehicle always uses a certain key fob, paired electronic device, seat position stored in memory, or is identified via a facial recognition camera or sensor the interaction and telemetric data of the vehicle may be associated with the user. The usage information may also be determined based on a connected profile and stored online in a database.

The method may comprise communicating the educational information 128 to the individual user. Particularly if a user's information, such as a phone number, address, or email address, is stored in a connected customer profile or database the user can be communicated through those means. Additionally, a user may link a number of their social media profiles so that they may be targeted with educational information on those profiles as well. Further, if a user's email address is known, for instance, the user may be targeted on platforms where they use their email address even if they have not provided those platforms directly to a connected database.

In another embodiment of the method, analyzing the usage information 122 further comprises determining a customer type of the individual user and communicating the educational information to the individual user's customer type. If the habits and interactions of the individual user can be generalized to a customer type, the individual user may be reached through communications that target their customer type. For instance, if an individual user of a particular mobile device, of a certain age, and primarily residing in an urban location does not use carsharing services and these traits can be generalized to a customer type. Educational information may be communicated through platforms targeting customer type based on these shared traits concerning carsharing services.

Analyzing the usage information 122, in an embodiment, may further comprise determining if previous educational information was communicated to the individual user. The decision to resupply the user with educational information can be determined by re-examining their usage information after the initial communication. If there has been a positive effect on their interaction behavior concerning a feature and the usage threshold, that may be an indication that the user is beginning to use the feature or they now have enough confidence to try the feature once more once they have a greater understanding of how to use it.

Selecting an at least one communication channel 126, in another embodiment, may further comprise selecting a different communication channel. Factors that could govern a change in the channel the resupplied educational information is delivered on could be age (perhaps the user is older and does not have a large internet presence), gender, location of residence, work and life ratio, or vehicle type. For example, the data may show the user makes extensive use of the product manufacture's app, in that case, the selected channel should be switched to sending a push notification with the selected educational information.

The usage information may comprise information from a central processing unit of the product, or an electronic device connected to the product. Interaction and telemetric data can be taken directly from a product through onboard computer systems with access to the telemetry data of the vehicle and connected software and hardware components. Usage information may also be taken from a device connected to the product, such as the user's cell phone. A cell phone may receive information from the product and relay it in real-time or periodically. This may be useful if a user's product does not have a dedicated internet connection, such as a cellular radio. A cell phone may also be able to deduce information about the product and supplement the information provided by the product alone.

The usage information may comprise information related to systems usage, journey, maintenance, or the user of a vehicle. Information may be obtained from a user, the external environment, the interior or exterior of a vehicle, the vehicle systems, or data provided by the vehicle or users. For example, information may include data on climate control systems, entertainment systems, scent dispersal systems, or intelligent personal assistant systems.

The educational information may comprise information related to vehicle features, events, supplementary products, or environments.

Communicating the educational information may comprise communication by telecommunication, advertising, notifications on personal electronic devices, or physical media. Communication may be done by any means to reach the intended recipient. Channels of communication may further include streaming media or video platforms, audio platforms, email, app notifications, web advertisements, text or media messages, email, physical mail, phone calls from customer information centers, social media, and vendor or dealer outreach programs.

The usage information may comprise information on the feature related to the vehicle that a user does not use, and the educational information may comprise information on how to use the feature. Educational information may be targeted to increase the usage of a feature of a vehicle to encourage maximum utilization of the product. The way it is determined if a feature is used or unused may be done on a cloud network. The usage information is collected as raw data that may show what features have been interacted with or otherwise engaged. For example, if a user interacts with a media interface but never scrolls down to launch or view the Spotify app it may be determined that the user is unaware of the Spotify feature. Therefore, educational information on the vehicle's Spotify integration feature may be communicated with the user.

Educational information may be communicated on a display of the vehicle. The educational information may be communicated on an at least one two-dimensional display. It may also be communicated on any number of vehicle displays and touch screens, digital projectors, or virtual reality (VR), mixed reality (MR), and augmented reality (AR) displays.

The method may be performed by an apparatus for informing a user of a vehicle about a feature related to the vehicle. The apparatus may comprise an at least one interface configured to communicate with at least the vehicle and the user a processor. The processor may be configured to receive usage information via the at least one interface relating to an at least one feature of the vehicle, analyze the usage information to determine if the received information exceeds a usage threshold, and select educational information based on the usage information. The educational information comprising information relating to the at least one feature. The processor may be further configured to select an at least one communication channel and communicate the educational information through the at least one communication channel via the at least one interface.

Additionally, the apparatus may be contained in a vehicle, a server, or a phone. Parts of the apparatus may be contained in a cloud network, including parts of the customer profile that links the user to the vehicle stored on a database. The vehicle may relay the usage data to a server for data management. Analyzing the usage data 122 may be done on an analytics platform, meaning a server where usage data can be processed and applied to specific educational information so that it may be sent to the targeted user.

Figure 2:
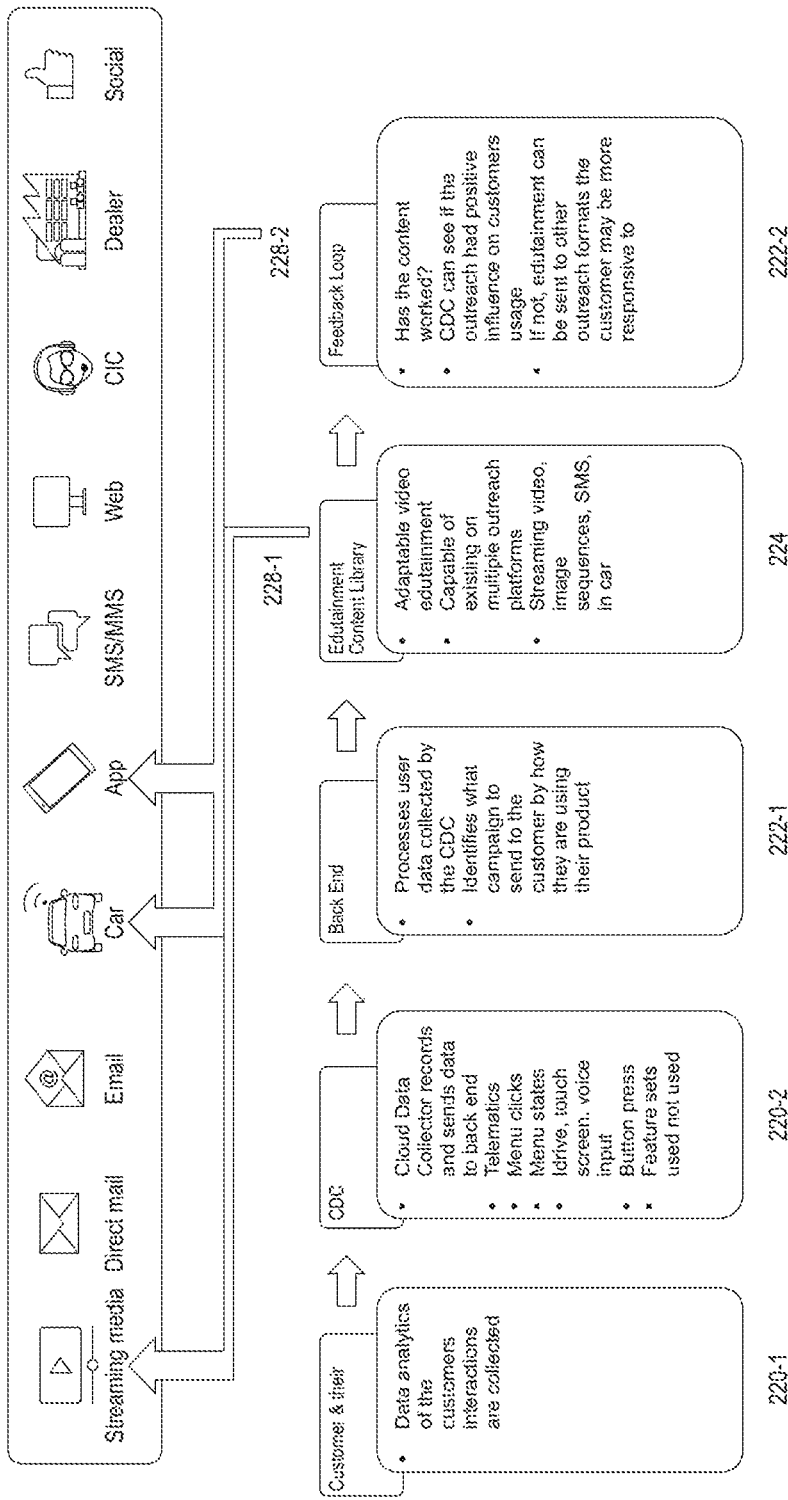
FIG. 2 shows a schematic diagram of an apparatus communicating product information.

FIG. 2 shows a schematic of the architecture of the process stored on the machine-readable medium. A non-transitory, machine-readable medium may store a program causing a computer to execute a process for informing a user of a vehicle about a feature related to the vehicle. The process may comprise receiving usage information 220-1 relating to an at least one feature of a product, analyzing the usage information to determine if the received information exceeds a usage threshold 220-1, selecting educational information 222 based on the usage information, wherein the educational information comprises information relating to the at least one feature, selecting an at least one communication channel 224, and communicating the educational information 228-1 through the at least one communication channel.

FIG. 2 further shows the usage data collected and organized by an optional cloud data collector 220-2 before being analyzed. Upon repeated iterations of the process, analyzing the usage information 222-1 may comprise a feedback loop 222-2 to determine if the user is better reached over different communication channels 228-2.

Any of the above-described embodiments may be combined with any other embodiment (or combination of examples) unless explicitly stated otherwise. The foregoing description of one or more implementations provides illustration and description but is not intended to be exhaustive or to limit the scope of embodiments to the precise form disclosed. Modifications and variations are possible in light of the above teachings or may be acquired from practice of various embodiments.

The aspects and features mentioned and described together with one or more of the previously detailed embodiments and figures, may as well be combined with one or more of the other examples to replace a like feature of the other embodiment or to additionally introduce the feature to the other embodiment.

Examples may further be or relate to a computer program having a program code for performing one or more of the above methods when the computer program is executed on a computer or processor. Steps, operations or processes of various above-described methods may be performed by programmed computers or processors. Examples may also cover program storage devices such as digital data storage media, which are machine, processor, or computer-readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further embodiments may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples and embodiments recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", may be implemented in the form of dedicated hardware, such as "a signal provider", "a signal processing unit", "a processor", "a controller", as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application-specific integrated circuit (ASIC), FPGA, read-only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer-readable medium and so executed by a computer or processor, whether or not such computer or processor is explicitly shown. Methods disclosed in the specification or the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples/embodiments a single act, function, process, operation or step may include or may be broken into multiple sub-acts, -functions, -processes, -operations, or -steps, respectively. Such sub acts may be included and part of the disclosure of this single act unless explicitly excluded.

Furthermore, the following claims are hereby incorporated into the detailed description, where each claim may stand on its own as a separate example or embodiment. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent on the independent claim.

What is claimed is:

1. A method for communicating educational information about an at least one feature to an individual user of a vehicle, the method comprising:
    identifying the individual in the vehicle,
    collecting usage information of the at least one feature connected to a central processing unit associated with the vehicle,
        wherein the usage information comprises,
        identifying information of the individual and
        information relating to the individual's non-usage of the feature,
    retrieve feedback information relating to the individual,
        wherein the feedback information comprises the individual's previous usage threshold information, previous educational information, and previous communication channel information,
    setting a usage threshold the at least one feature based the previous threshold information,
    adjusting the usage threshold based on the previous educational information and the previous channel information, and
    determining if the collected usage information exceeds the usage threshold,
    selecting educational information when the usage threshold is exceeded, wherein the educational information comprises information relating to how to use the at least one feature,
    selecting a communication channel targeting the individual user,
        wherein the selection is targeted based on the identifying information and
        wherein the selection is different than indicated in the previous channel information, and
    communicating the educational information through the communication channel, storing the usage threshold, education information, and communication channel as the feedback information.

2. The method of claim 1 further comprising:
    selecting an at least one physical media communication channel and;
    communicating the educational information through at least one physical media communication channel.

3. The method of claim 1:
    wherein analyzing the usage information further comprises determining a customer type of the individual, and
    wherein selecting an at least one communication channel further comprises selecting a communication channel targeting the individual's customer type.

4. The method of claim 1 wherein the central processing unit associated with the vehicle is included within:
    the vehicle, or
    an electronic device connected to the vehicle.

5. The method of claim 1 wherein the usage information comprises information related to:
    systems usage,
    journey,
    maintenance, or
    the individual user.

6. The method of claim 1 wherein the educational information comprises information related to:
    additional features of the vehicle,
    events,
    supplementary products, or
    environments.

7. The method of claim 1 wherein the communication channel comprises communication by:
    telecommunication,
    advertising, or
    notifications on the individual user's personal electronic devices.

8. The method of claim 1 wherein the communicating of the educational information happens on a display of the vehicle.

9. The method of claim 7 wherein the communicating the educational information through the electronic communication channel further comprises:
    sending an email to an inbox of the individual user,
    pushing a notification to an app, or
    advertising to the user over an online advertisement platform.

10. An apparatus for communicating education information about an at least one feature to an individual user of a vehicle, the apparatus comprising:
    an at least one interface configured to communicate with at least the vehicle and the individual,
    a processor configured to:
        receive identifying information of the individual in the vehicle via the at least one interface,
        collect usage information of the at least one feature connected to a central processing unit associated with the vehicle via the at least one interface,
            wherein the usage information comprises,
            the identifying information of the individual, and information relating to the individual's non-usage of the feature, set a usage threshold relating to the at least one feature based the previous threshold information, adjust the usage threshold based on the previous educational information and the previous channel information, and determine if the collected usage information exceeds the usage threshold, select educational information when the usage threshold is exceeded, wherein the educational information comprises information relating to how to use the at least one feature, select a communication channel targeting the individual user, wherein the selection is targeted based on the identifying information and wherein the selection is different than indicated in the previous channel information, and communicate the educational information to the individual through the communication channel via the at least one interface, store the usage threshold, education information, and communication channel as the feedback information.

11. A vehicle comprising the apparatus of claim 10.

12. A server comprising the apparatus of claim 10.

13. A phone comprising the apparatus of claim 10.

14. A non-transitory, machine-readable medium storing a program causing a computer to execute a process for communicating education information about an at least one feature to an individual user of a vehicle according to the method of claim 1.

\* \* \* \* \*